US012428794B1

(12) United States Patent
Chamberlin

(10) Patent No.: US 12,428,794 B1
(45) Date of Patent: Sep. 30, 2025

(54) BOAT SLIP BARRIER

(71) Applicant: David Chamberlin, Mission Viejo, CA (US)

(72) Inventor: David Chamberlin, Mission Viejo, CA (US)

( * ) Notice: Subject to any disclaimer, the term of this patent is extended or adjusted under 35 U.S.C. 154(b) by 0 days.

(21) Appl. No.: 18/758,452

(22) Filed: Jun. 28, 2024

(51) Int. Cl.
*E01F 13/06* (2006.01)

(52) U.S. Cl.
CPC ............ *E01F 13/06* (2013.01); *E01F 13/065* (2013.01); *E05Y 2900/402* (2013.01)

(58) Field of Classification Search
CPC ....... E01F 13/06; E01F 13/042; E01F 13/065; B61L 29/04; E05Y 2900/402
USPC .............................................................. 49/49
See application file for complete search history.

(56) References Cited

U.S. PATENT DOCUMENTS 4,658,543 A * 4/1987 Carr ........................ B61L 29/04 49/192
4,666,108 A * 5/1987 Fox ......................... B61L 29/04 246/272
4,941,284 A * 7/1990 Stoller .................. E01F 13/065 49/343
6,212,825 B1 * 4/2001 Hopkins, Jr. ........... E01F 13/06 49/358
6,460,292 B1 10/2002 Rodriguez et al.
6,618,993 B2 * 9/2003 Burke ..................... E01F 13/06 49/49
6,792,716 B1 * 9/2004 Luster ..................... E01F 13/06 49/49
6,997,417 B2 * 2/2006 Zarkades ................ B61L 29/04 246/127
7,258,461 B1 * 8/2007 Izardel .................... E01F 13/04 362/183
7,384,017 B1 * 6/2008 Burke ..................... B61L 29/04 246/127
7,533,494 B2 * 5/2009 Burke ..................... E01F 13/06 49/49
9,487,224 B1 * 11/2016 Pless ..................... E05F 15/643
9,822,501 B2 * 11/2017 Younce ................... E01F 13/10
11,074,773 B1 * 7/2021 Morris .................... B60L 53/68
11,214,934 B2 * 1/2022 Matthews ............... E01F 13/12
2002/0129552 A1 * 9/2002 Burke ..................... B61L 29/22 49/49
2004/0088923 A1 * 5/2004 Burke ..................... B61L 29/04 49/49
2005/0060936 A1 * 3/2005 Burke ..................... B61L 29/30 49/49

(Continued)

*Primary Examiner* — Justin B Rephann
(74) *Attorney, Agent, or Firm* — Sanchelima & Associates, P.A.; Jesus Sanchelima; Christian Sanchelima

(57) ABSTRACT

A boat slip barrier system is disclosed comprising a pivoting barrier arm assembly, a first post assembly with a first vertical post pivotally connected to the barrier arm, and a second post assembly with a second vertical post configured to temporarily hold a distal end of the barrier arm. The barrier arm can pivot between a closed configuration and an opened configuration, controlled by a remote control. The barrier arm assembly may include telescoping sections actuated for extension and retraction. The post assemblies may incorporate housings, actuators, microcontrollers, cameras, lights, and reflectors for enhanced visibility and remote operation. The system aims to provide a secure and controlled access barrier for a boat slip.

2 Claims, 6 Drawing Sheets

(56) References Cited

U.S. PATENT DOCUMENTS

| | | | | |
|---|---|---|---|---|
| 2007/0085067 | A1* | 4/2007 | Lewis | E01F 13/065<br>256/73 |
| 2009/0060649 | A1* | 3/2009 | Neff | E01F 13/06<br>404/6 |
| 2017/0198448 | A1* | 7/2017 | Han | E01F 13/042 |
| 2019/0057376 | A1* | 2/2019 | Perez-Tamayo | G06Q 20/3278 |
| 2019/0254136 | A1* | 8/2019 | Brinkman | G06F 3/0202 |
| 2021/0053597 | A1* | 2/2021 | Fox | B61L 29/04 |
| 2023/0048680 | A1* | 2/2023 | Wang | B60W 40/02 |

* cited by examiner

BOAT SLIP BARRIER

BACKGROUND OF THE INVENTION

1. Field of the Invention

The present invention relates to barriers and, more particularly, to a boat slip barrier that include a pivoting arm that prevents unauthorized boats from accessing the boat slip.

2. Description of the Related Art

Several designs for barriers have been designed in the past. None of them, however, include a boat slip barrier that blocks the access of unauthorized boats to a boat slip, and allows the access to the authorized boats via a remote control.

Applicant believes that a related reference corresponds to U.S. Pat. No. 6,460,292 issued for an automatic vehicle gate operating mechanism and barrier arm assembly having a control unit for an operating mechanism that is activated by only an authorized vehicle or an operator through a remote switch. Applicant believes that another related reference corresponds to U.S. Pat. No. 4,941,284 issued for a parking barrier that is remotely controlled and includes a vertically pivotally mounted post having an L-shaped arm secured at one end to the post and projecting outwardly therefrom, lying in a generally horizontal plana. None of these references, however, teach of a boat slip barrier comprising a pivoting arm, dual vertical support posts, one of which holds the arm in a pivoting manner the other temporarily holds the distal end of the arm, and where the arm is operated from closed to open, or open to closed, using a wireless remote control.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a boat slip barrier that includes a barrier assembly pivotally connected to a first post assembly, said barrier assembly is configured to prevent unauthorized access to boat slips.

It is another object of this invention to provide a boat slip barrier that includes a remote control to control the pivotally connected barrier assembly to open or close the boat slip.

It is still another object of the present invention to provide a boat slip barrier that includes a plurality of reflectors and flashing LED lights for added attention and safety at night.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
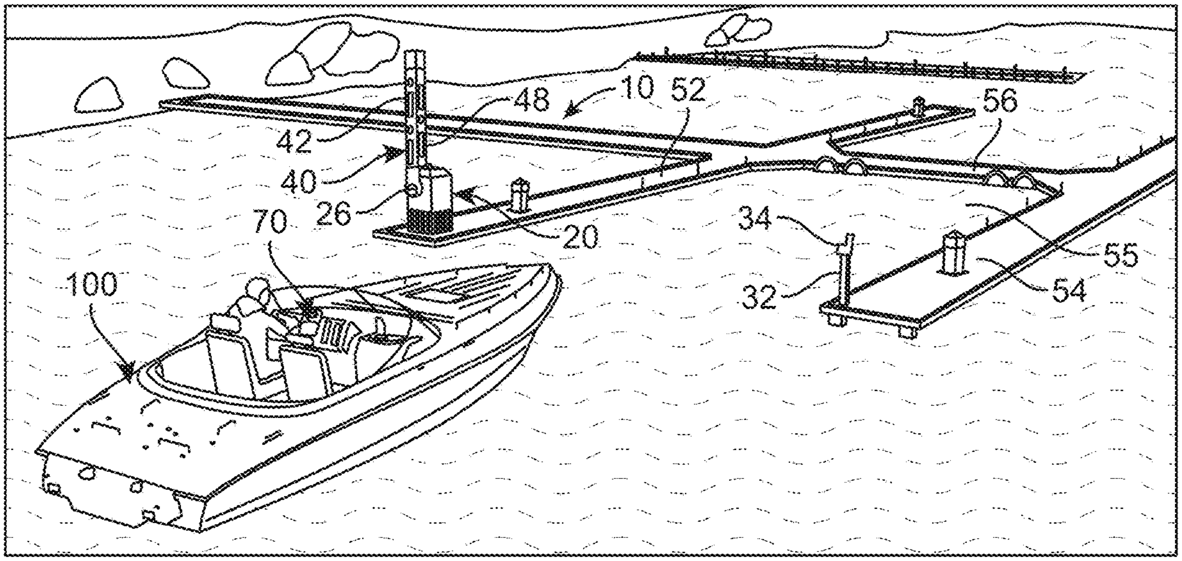
FIG. 1 represents an isometric operational view of the present invention 10 showing the barrier assembly 40 in an open configuration. A user opened the barrier assembly 40 using a remote control 70.

Referring now to the drawings, where the present invention is generally referred to with numeral 10, it can be observed that it basically includes a first post assembly 20, a second post assembly 40 a barrier assembly 40, and a remote control 70. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 4:
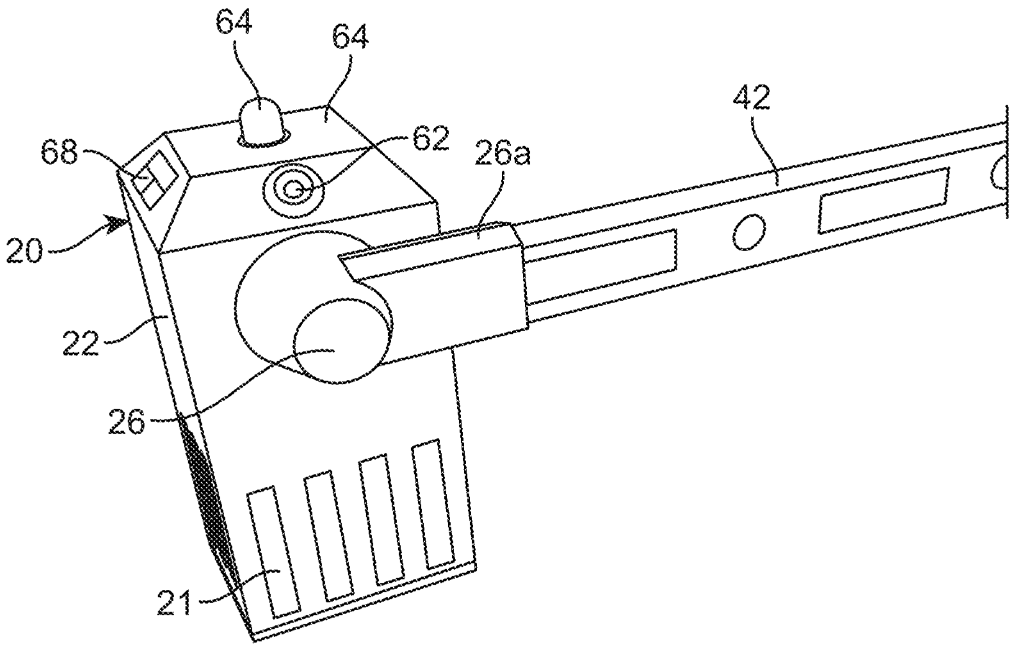
FIG. 4 is a representation of an isometric view of the first post assembly 20 showing the camera 62 and the strobe light 64 mounted thereon.

Best observed in FIG. 4, the first post assembly 20 includes a first post 22. The first post 22 is a housing. In one of the preferred embodiments, the first post 22 may have a substantially cuboid shape. In other embodiments, the first post 22 may have other suitable shapes such as a cylindrical shape, a polygonal shape, or the like. The first post 22 may have a top housing portion 24. The top housing portion 24 may be a tapered portion with a substantially trapezoid shape. The upper portion of the top housing portion 24 may have a flat square shape. The first post 22 may be made of a metal, a hard plastic or any other suitable material. The first post 22 may have a coating to avoid corrosion. The first post assembly 20 may be located on an end of a first boat slip portion 52. The first post assembly 20 may further include a plurality of reflectors 21 located on a bottom portion of the first post 22. The reflectors 21 may enhance the visibility for the boat users.

Figure 2:
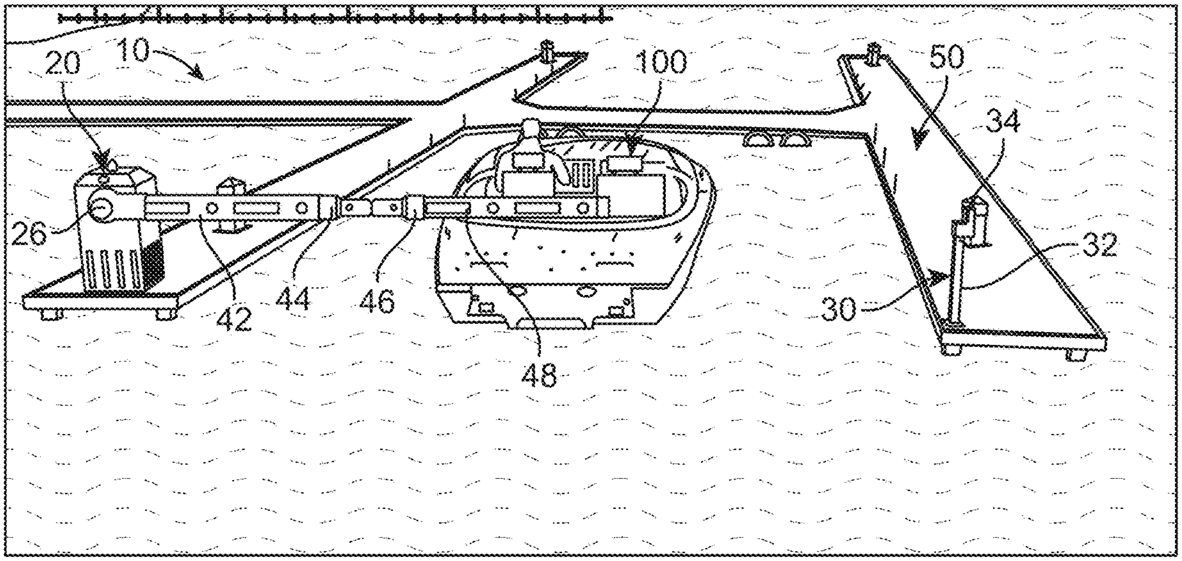
FIG. 2 shows an isometric operational view of the present invention 10 with the barrier assembly 40 in a partially closed configuration.
Figure 3:
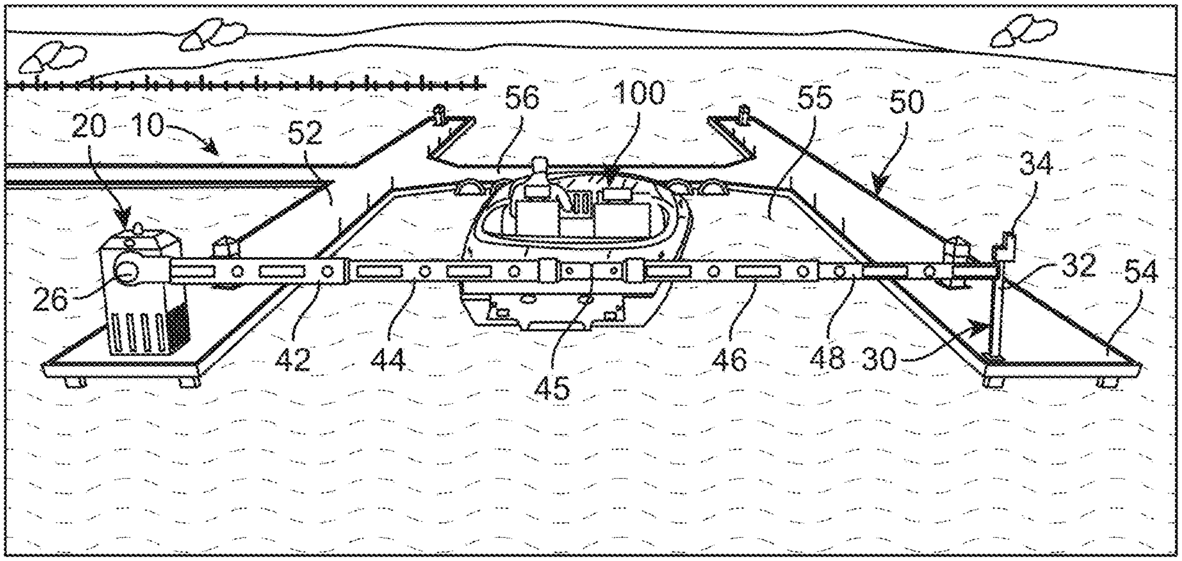
FIG. 3 illustrates an isometric operational view of the present invention 10 showing the boat 100 inside the boat slip 55 and the barrier assembly 40 in a closed configuration.

The second post assembly 40 may include a post 32 and a post holder 34 as observed in FIG. 1, FIG. 2, and FIG. 3. In one embodiment, the post 32 may have a square elongated shape. The post 32 may be made of metal, wood, or any other suitable material. The post 32 may have a coating to avoid corrosion. The post holder 34 may have a horizontal portion and a vertical portion defining a L-shaped post holder 34. The second post assembly 40 may be located on a second boat slip portion 54. The second boat slip portion 54 may be connected to the first boat slip portion 52 through a third boat slip portion 56 defining a boat slip 55 therebetween. The boat slip 55 may receive a boat 100 therein. The boat slip 55 may be a private boat slip 50.

Figure 5:
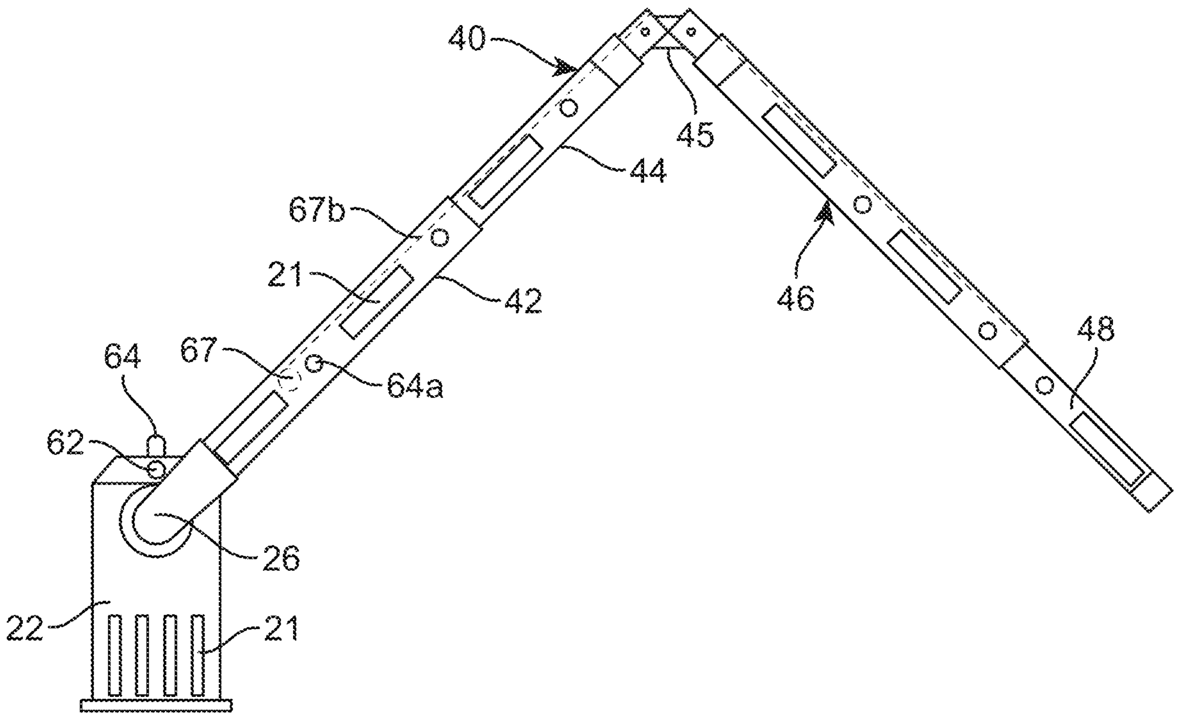
FIG. 5 is a front view of the barrier assembly 40 pivotally mounted to the pivot rotor portion 26 of the first post assembly 20.
Figure 6:
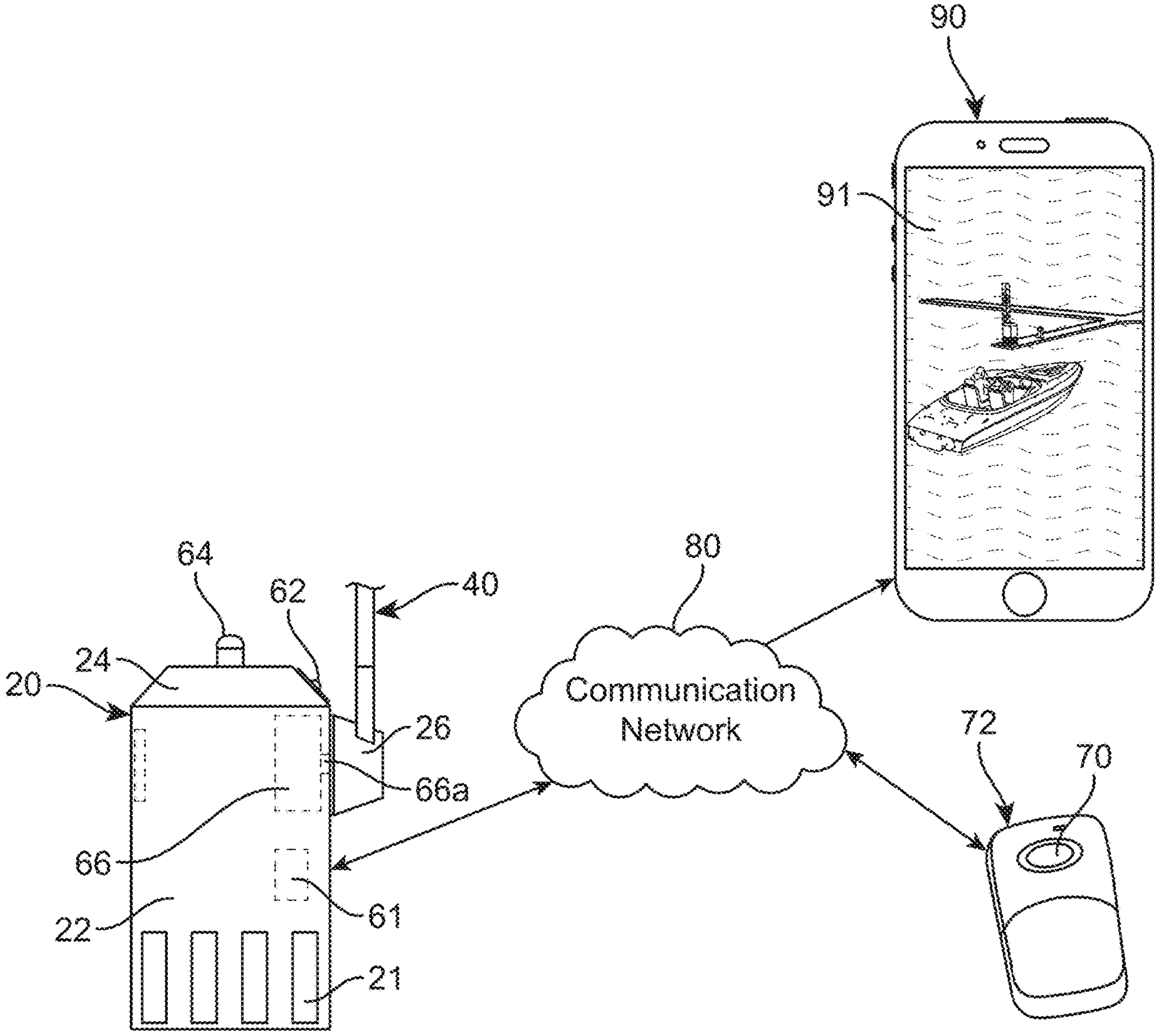
FIG. 6 is a diagram view showing a microcontroller 61 embedded inside the first post 22 in communication with a computerized device 90 and a remote control 70.

Best observed in FIG. 5, the barrier assembly 40 may include a first arm portion 42, a second arm portion 44, a third arm portion 46, and a fourth arm portion 48. The first arm portion 42 may have an elongated rectangular shape with a hollow interior. The second arm portion 44 may have an elongated rectangular shape with a hollow interior. The first arm portion 42 may have a larger width and depth than the width and depth of the second arm portion 44. The first arm portion 42 may slidably receive the second arm portion 44 therein. The third arm portion 46 may have an elongated rectangular shape with a hollow interior. The fourth arm portion 48 may have an elongated rectangular shape with a hollow interior. The second arm portion 44 and the third arm portion 46 may have the same width and depth. The fourth arm portion 48 and the first arm portion 42 may have the same width and depth. The third arm portion 46 may slidably receive the fourth arm portion 48 therein. an end of the second arm portion 44 may be hingedly attached to an end of the third arm portion 46 by an arm pivot 45. A proximal end of the first arm portion 42 may be received by a coupling member 26*a* of the pivot rotor portion 26 as observed in FIG. 4. The pivot rotor portion 26 may be pivotally coupled to a side of the first post 22.

The pivot rotor portion 26 may be mechanically coupled to a shaft 66*a* of an actuator 66. In one embodiment, the actuator 66 may be an electric motor. It also may be suitable for the actuator 66 to be a pneumatic actuator, a hydraulic actuator, or any other suitable type of actuator. The electric assembly 60 may include a microcontroller 61 to control the actuator 66. The microcontroller 61 may include a power stage module to drive the actuator 66. The microcontroller 61 may include wireless communication drivers to wirelessly communicate with a remote control 70 and with a computerized device 90 through a communication network 80. The microcontroller 61 may be programmed to actuate the actuator 66 to rotate the barrier assembly 40 from an opened position to a closed position and from a closed position to an opened position.

The microcontroller 61 may further be programmed to control a second actuator 67. The second actuator 67 may be embedded in the first arm portion 42. The second actuator 67 may be mechanically engaged to a transmission system 67*b*. The transmission system 67*b* may be engaged to the first arm portion 42, second arm portion 44, third arm portion 46, and fourth arm portion 48. The second actuator 67 and the transmission system 67*b* may allow the extension and contraction of the barrier assembly 40. The second actuator 67 may actuate the barrier assembly 40 in a fully retracted position configuration as observed in FIG. 1. In the fully retracted position configuration, the actuator 66 may drive the first arm portion 42 in a vertical position and the second actuator 67 and transmission system 67*b* may retract the barrier assembly 40 with the arm pivot 45 in a folded position. A user may use the button 72 of the remote control 70 to open or close the barrier assembly 40. The actuator 66 may be actuated to rotate to a horizontal position for the barrier assembly 40 and the second actuator 67 may drive telescopically expand the barrier assembly 40 allowing the fourth arm portion 48 to rest in the post holder 34 as observed in FIG. 3.

The barrier assembly 40 may also include the reflectors 21 and a plurality of lights 64*a* distributed along the barrier assembly 40. The electric assembly 60 may further include a camera 62, a strobe light 64 and a control panel 68 located on the top housing portion 24 as observed in FIG. 4. The reflectors 21, the strobe light 64 and the lights 64*a* may enhance the visibility of the barrier when boats approach the private boat slip 50. The control panel 68 may allow to control the position of the barrier assembly 40. The control panel 68 may be a waterproof control panel. The electric assembly 60 may be powered by a battery. It also may be suitable to power the electric assembly 60 with a cord connected to an electric grid. The camera 62 may be configured to film and transmit a video in real time to the computerized device 90. The computerized device 90 may be programmed with an application 91 to allow a user to watch the video from the camera 62 and see if someone is trying to access the private boat slip 50. The application 91 may further allow the control of the position of the barrier assembly 40. The barrier assembly 40 in a closed configuration may prevent unauthorized access to the private boat slip 50.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A boat slip barrier, comprising:

a) a barrier assembly including a pivoting barrier arm with a first arm portion, a second arm portion, a third arm portion, and a fourth arm portion, the first arm portion slidably receives the second arm portion, the second arm portion and the third arm portion are hingedly connected, the third arm portion slidably receives the fourth arm portion, defining a telescopic barrier arm;

b) a first post assembly including a first vertical post, wherein the pivoting barrier arm is pivotally connected to said first vertical post;

c) a second post assembly including a second vertical post configured to temporarily hold a distal end of said pivoting barrier arm;

d) an electrical assembly including a first actuator, a second actuator, and a microcontroller, said first actuator is embedded in the first post assembly to rotate the barrier assembly from a vertical position to a horizontal position, said microcontroller controls the first actuator and the second actuator, said second actuator allows the extension and retraction of the barrier assembly, said electrical assembly further includes a camera and a plurality of lights, the plurality of lights is located on the first post assembly and on the barrier assembly; and e) a remote control to operate said pivoting barrier arm from a closed configuration to an opened configuration and from the opened configuration to the closed configuration.

2. A boat slip barrier, consisting of:

a) a barrier assembly including a pivoting barrier arm with a first arm portion, a second arm portion, a third arm portion, and a fourth arm portion, the first arm portion slidably receives the second arm portion, the second arm portion and the third arm portion are hingedly connected, the third arm portion slidably receives the fourth arm portion, defining a telescopic barrier arm;

b) a first post assembly including a first vertical post, wherein the pivoting barrier arm is pivotally connected to said first vertical post;

c) a second post assembly including a second vertical post configured to temporarily hold a distal end of said pivoting barrier arm;

d) an electrical assembly including a first actuator, a second actuator, and a microcontroller, said first actuator is embedded in the first post assembly to rotate the barrier assembly from a vertical position to a horizontal position, said microcontroller controls the first actuator and the second actuator, said second actuator allows the extension and retraction of the barrier assembly, said electrical assembly further includes a camera and a plurality of lights, the plurality of lights is located on the first post assembly and on the barrier assembly;

e) a remote control to operate said pivoting barrier arm from a closed configuration to an opened configuration and from the opened configuration to the closed configuration.

* * * * *